US005747684A

United States Patent [19]

Pace et al.

[11] Patent Number: 5,747,684

[45] Date of Patent: May 5, 1998

[54] METHOD AND APPARATUS FOR ACCURATELY DETERMINING OPENING AND CLOSING TIMES FOR AUTOMOTIVE FUEL INJECTORS

[75] Inventors: Jeffrey B. Pace, Newport News; Vernon R. Warner, Wicomico; Danny O. Wright, Cobbs Creek, all of Va.

[73] Assignee: Siemens Automotive Corporation, Auburn Hills, Mich.

[21] Appl. No.: 686,935

[22] Filed: Jul. 26, 1996

[51] Int. Cl.[6] .......... G01M 15/00; G01L 3/26

[52] U.S. Cl. .......... 73/119 A; 73/116

[58] Field of Search .......... 73/116, 117.3, 73/118.1, 119 A

[56] References Cited

U.S. PATENT DOCUMENTS

| | | | |
|---|---|---|---|
| 3,732,492 | 5/1973 | Geul . | |
| 3,899,664 | 8/1975 | Bencini et al. | 73/489 |
| 4,002,155 | 1/1977 | Harned et al. | 73/119 R |
| 4,102,181 | 7/1978 | Cser et al. | 73/119 A |
| 4,228,680 | 10/1980 | Engel et al. . | |
| 4,573,443 | 3/1986 | Watanabe | 123/492 |
| 4,638,659 | 1/1987 | Schiessle et al. . | |
| 4,687,994 | 8/1987 | Fulkerson et al. . | |
| 4,785,771 | 11/1988 | Ibuki et al. | 73/119 A |
| 4,793,313 | 12/1988 | Paganon et al. . | |
| 4,838,080 | 6/1989 | Okano . | |
| 4,967,711 | 11/1990 | Morikawa | 123/478 |
| 5,005,404 | 4/1991 | Ricco et al. . | |
| 5,109,885 | 5/1992 | Tauscher . | |
| 5,311,903 | 5/1994 | Poulin . | |
| 5,433,109 | 7/1995 | Mayer-Dick et al. . | |

*Primary Examiner*—George M. Dombroske

*Assistant Examiner*—Max H. Noori

*Attorney, Agent, or Firm*—Russel C. Wells

[57] ABSTRACT

Opening and closing times of a fuel injector are accurately determined in accordance with the energy content of an accelerometer trace. The energy content of an accelerometer trace is determined in accordance with a predetermined relation. A line is defined between known points prior to and after the opening or closing time. The normal distance between the line connecting known points and the accelerometer trace energy content is maximum at the inflection point, which corresponds to the opening or closing time. With this data, an ECU can be properly programmed to more accurately control an injector stroke, thereby improving engine performance.

6 Claims, 2 Drawing Sheets

METHOD AND APPARATUS FOR ACCURATELY DETERMINING OPENING AND CLOSING TIMES FOR AUTOMOTIVE FUEL INJECTORS

BACKGROUND OF THE INVENTION

The present invention relates to fuel injectors and, in particular, to a method and apparatus for accurately determining opening and closing times of a fuel injector in accordance with the energy content of an accelerometer trace.

An electromagnetic fuel injector utilizes a solenoid assembly to supply an actuating force to a fuel metering valve. Typically, a plunger-style armature supporting a fuel injector needle reciprocates between a closed position, where the needle is closed to prevent fuel from escaping through the discharge orifice, and an open position, where fuel is discharged through the discharge orifice.

When the solenoid is energized, the solenoid armature, and thus the injector needle, is magnetically drawn from the closed position toward the open position by a solenoid generated magnetic flux. Several methods have been proposed to determine the opening and closing times of the fuel injector. This information is essential for accurately programming an electronic control unit (ECU), which supplies current to the solenoid, for operation during driving conditions. That is, the ECU must be programmed with data relating to fuel injector responsiveness in all driving conditions across a broad range of current loads so as to enable the fuel injector to inject a proper amount of fuel at all times. Various driving conditions in particular effect the current applied to the solenoid and thus the opening and closing times of the fuel injector. Such driving conditions include, for example, start-up, driving with lights on, driving with air-conditioner on, driving with other components requiring electrical input, etc.

In one prior method, a voltage threshold is set, and voltages that occur above the set voltage threshold are determined to correspond to an opening time. This method, however, is not effective for closing times because an improper threshold may be selected or the pulse width may be small resulting in overlap. The overlapping pulse widths tend to drown the opening voltage readings. Other methods include Fourier analyses, however, vibration factors are constantly changing thereby rendering the analyses less accurate.

Still another prior method includes using an accelerometer trace or an oscilloscope to visually illustrate a vibration pattern of the injector. With this method, an operator can visually determine opening and closing times with variations in injector vibration. A typical accelerometer trace is shown in FIG. 1. When the armature impacts the pole piece on opening, the impact energy excites mechanical vibrations in the structure, which are detected by the accelerometer. This energy then damps out, and the accelerometer trace decays. On closing, similar events occur when the needle contacts the seat. It is necessary that there be some interval for the opening transient to decay, so that opening can be distinguished from closing. That is, as noted above, it is difficult to measure closing time when the opening and closing signals overlap, which occurs frequently at shorter pulse widths or lower operating voltages. With this method, all opening and closing times are measured manually. Technicians record opening and closing times from the accelerometer trace, which is labor intensive and susceptible to measurement errors, since operator judgement is required.

SUMMARY OF THE INVENTION

It is therefore an object of the invention to provide an improved method and apparatus for determining opening and closing times of a fuel injector. This and other objects of the invention are achieved by a method including the steps of (a) recording an accelerometer trace of a fuel injector stroke, and (b) determining an opening or closing time of the fuel injector in accordance with an energy content of the accelerometer trace. The energy content of the accelerometer trace is preferably determined in accordance with a predetermined relation. Step (b) is preferably further practiced by (c) selecting a known point in time prior to opening or closing of the fuel injector, (d) selecting a known point in time after opening or closing of the fuel injector, and (e) determining the opening or closing time in accordance with a distance between a line connecting the known points prior to and after opening or closing of the fuel injector and the energy content, wherein the opening or closing time is the time at which the distance is maximum. Step (e) may be practiced by determining a slope of the line connecting the known points and determining the normal distance between the line connecting the known points and the energy content. Step (e) may be further practiced by determining a y-axis intercept of the line connecting the known points. A point on the line connecting the known points at a time t is determined in accordance with a predetermined relation.

In accordance with another aspect of the invention, a corresponding apparatus is provided including an accelerometer that records an accelerometer trace of a fuel injector stroke and a processor that determines an opening or closing time of the fuel injector in accordance with an energy content of the accelerometer trace.

BRIEF DESCRIPTION OF THE DRAWINGS

These and other aspects and advantages of the present invention will be apparent from the following detailed description of preferred embodiments when read in conjunction with the accompanying drawings, in which.

DETAILED DESCRIPTION OF PREFERRED EMBODIMENTS

In accordance with the present invention, the opening and closing times for a fuel injector are determined in accordance with the energy content of an accelerometer trace. As previously established, for example, in *Signals and Systems. Continuous and Discrete*, Ziemer et al., Macmillan Publishing Co., pages 23–24, the energy content of a time domain signal can be written as:

$$E(t) \equiv \lim_{t \to \infty} \int_{-T}^{T} [x(t)]^2 dt \tag{1}$$

For the discrete time case, i.e., for a single pulse event, the energy is given as:

$$E(t_n) \equiv \sum_n [x(t_n)]^2 \quad (2)$$

From this relation, the energy function is always positive (or zero) and monotonically increasing. The quantity dE(t)/dt is a measure of the rate of change of energy into the system. In particular, when impacts occur on opening or closing, dE/dt should greatly increase. When the accelerometer trace is small or decays, dE/dt should be close to zero. This E(t) slope change can then be used to identify opening and closing times.

Figure 1:
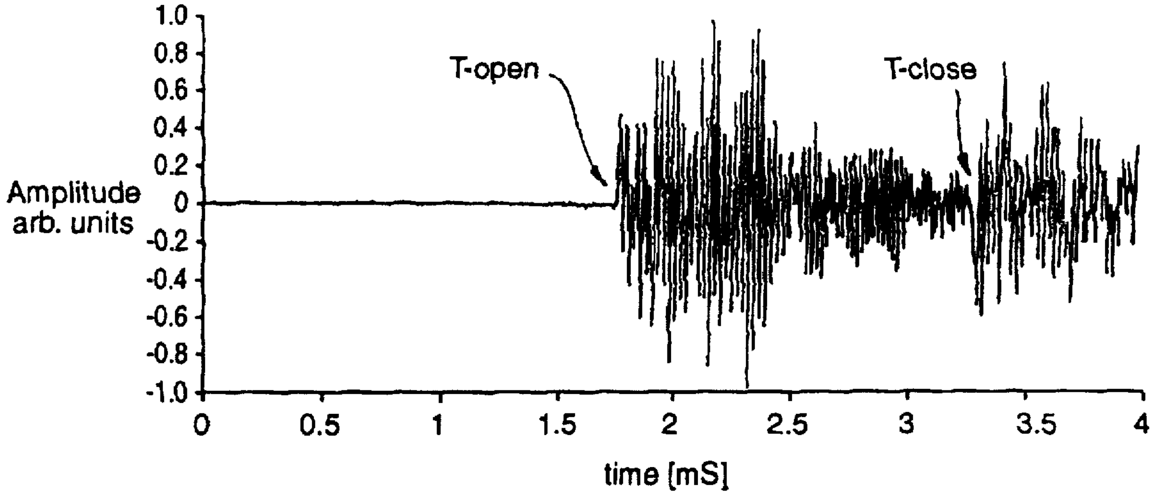
FIG. 1 illustrates a typical accelerometer trace.
Figure 2:
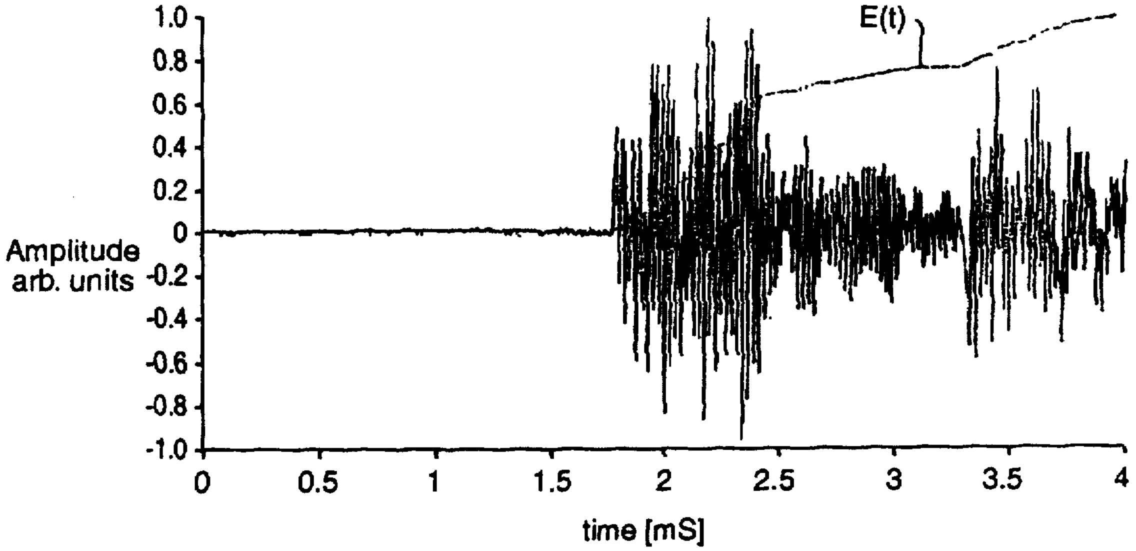
FIG. 2 illustrates the energy content of the accelerometer trace illustrated in FIG. 1.

In accordance with the method of the invention, an accelerometer trace is acquired in a known manner (step S1). Applying the above energy content rules to the accelerometer trace provides the result shown in FIG. 2 (step S2). As can be seen, opening and closing time are reflected as the upward inflection point of the E(t) curve.

Figure 3:
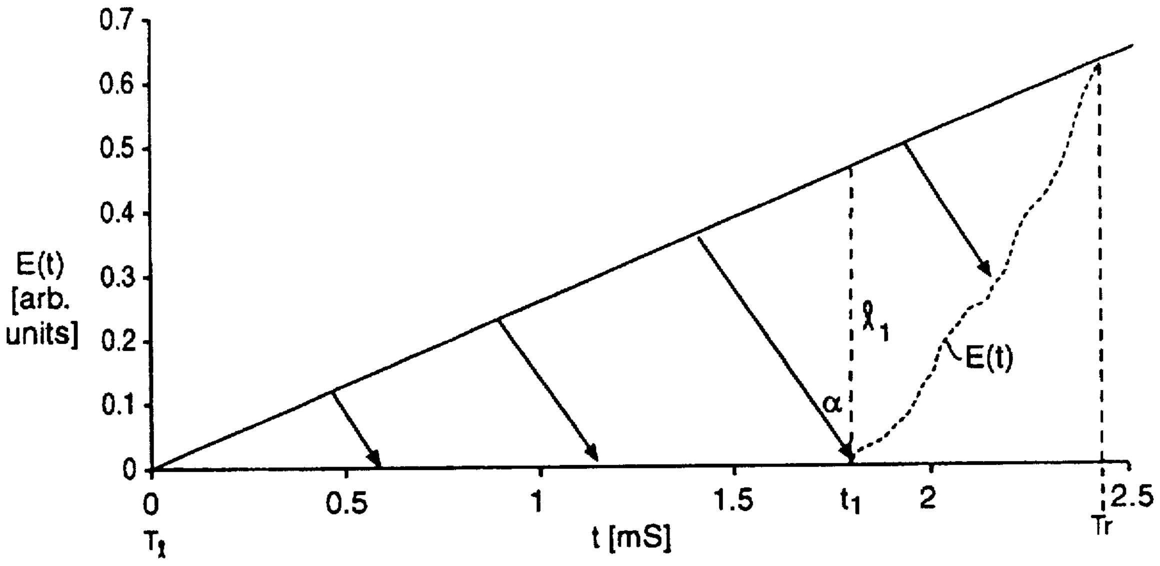
FIG. 3 is a graph of a line connecting known points prior to and after an injector opening time and its normal distance to the energy content.
Figure 4:
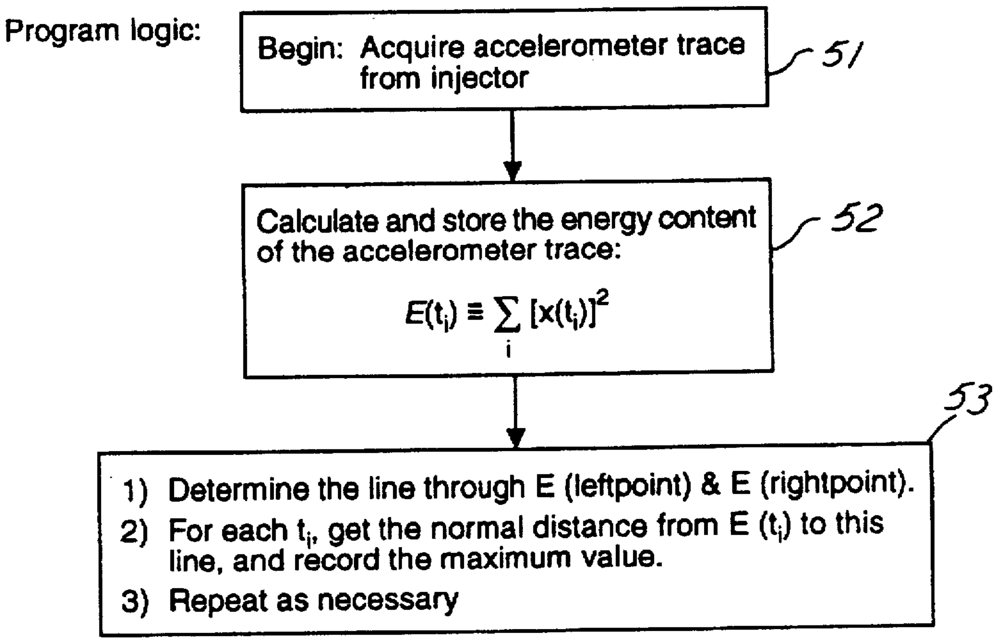
FIG. 4 is a flow chart illustrating the method according to the present invention.

Referring to FIG. 3, the opening component of the E(t) curve is illustrated for example purposes. Using this curve, the inflection point of the E(t) curve can be identified.

For the given pulse width, a time $T_l$ is selected that is known to be prior to (left of) the opening time. An example would be the beginning of the injector timing pulse. Next, a time $T_r$ is selected that is known to be after (right of) the opening time. A straight line is drawn between $E(t_l)$ and $E(t_r)$, and the slope m and y-intercept b are determined. Next, consider the normal distance between this line and the E(t) curve. For a point given as $t_i$ the point on the line directly above $t_i$ is given as:

$$y_i = mt_i + b \quad (3)$$

The vertical distance is then:

$$1_i = (y_i - E(t_i)) \quad (4)$$

Optionally, the distance from $E(t_i)$, perpendicular to the line is:

$$1_i \cos(\alpha) \quad (5)$$

This procedure is repeated for each point $T_i$ noting the maximum value (step S3). This maximum distance is the inflection point corresponding to the injector opening time. A similar process is used for closing time.

Using the energy content of an accelerometer trace, the opening and closing time of a fuel injector can be accurately determined without the drawbacks associated with threshold voltages, Fourier analyses and manual accelerometer trace measurements. By knowing the injector response characteristics across a broad range of driving conditions (current loads), an ECU can be more accurately programmed, thereby resulting in improved engine performance.

A control system for determining the opening and/or closing times of a fuel injector used to inject fuel into an internal combustion engine for a motor vehicle, has an accelerometer coupled to one or more of the fuel injectors. In a preferred embodiment, only one accelerometer is used which responds to one injector. The reason is one of cost and simplicity as it has been found that the repeatability of fuel injectors as to their operate times is excellent. If it was desired to know the operate and closing times of each injector in an engine, it would be necessary to determine the accelerometer trace for each injector which would require a plurality of accelerometers.

Once the trace is determined , the trace is supplied through an a-d converter and the result is stored in a memory means in the electronic control unit as explained in S1. The mathematical capabilities of a processor then makes the calculations to calculate and store the energy content of the accelerometer trace as hereinbefore explained with reference to S2.

Next the calculations for determining the line through the E(leftpoint) $T_l$ and E(rightpoint) $T_r$ are done. For each $t_i$, the normal distance from $E(t_i)$ is calculated and stored. When the maximum value is determined this value will give the time of the injector actuation, either opening or closing.

This information is supplied to the pulse width fuel signal which is generated by the ECU to modify the desired calculated pulse width by the actual opening and closing times. This modified pulse width provides the control signal to the injectors to inject the precise and accurate amount of fuel into the engine. Factors which affect the pulse width are the changing of electrical loads in the vehicle, temperature of the injector environment, etc.

As previously indicated, due to the repeatability of each injector, it is necessary to determine the actual times of the first injector and use these times for each subsequent injector. The next time the first injector is actuated, the actual times from its previous operation is used and also the calculations are also made at this time for the next round of injectors. In short if the engine is a 6 cylinder engine with one injector per cylinder; injector number 1 is measured and its times are used for injectors 2–6 and also number 1 again the second time around. On the second time around, injector number 1 is again measured and this new measurement is applied to injectors 2–6 and number 1 the third time around and so on.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of determining opening and closing times of a fuel injector, the method comprising:

(a) recording an accelerometer trace of a fuel injector stroke; and (b) determining the energy content of the accelerometer trace in accordance with the relation:

$$E(t) \equiv \lim_{t \to \infty} \int_{-T}^{T} [x(t)]^2 dt$$

(c) selecting a known point in time prior to opening or closing of the fuel injector;

(d) selecting a known point in time after opening or closing of the fuel injector; and (e) determining the opening or closing time in accordance with a distance between a line connecting the known points prior to and after opening or closing of the fuel injector and the energy content, wherein the opening or closing time is the time at which the distance is maximum.

2. An apparatus for determining opening and closing times of a fuel injector, the apparatus comprising:

an accelerometer that records an accelerometer trace of a fuel injector stroke; and a processor that determines an opening or closing time of the fuel injector in accordance with an energy content of the accelerometer trace with the relation;

$$E(t) \equiv \lim_{t \to \infty} \int_{-T}^{T} [x(t)]^2 dt$$

said processor having means for selecting a known point in time prior to opening or closing of the fuel injector, means for selecting a known point in time after opening or closing of the fuel injector, and means for determining the opening or closing time in accordance with a distance between a line connecting the known points prior to and after opening or closing of the fuel injector and the energy content, wherein the opening or closing time is the time at which the distance is maximum.

3. An apparatus according to claim 2, wherein said means for determining comprises means for determining a slope of the line connecting the known points, and means for determining the normal distance between the line connecting the known points and the energy content.

4. A method according to claim 1, wherein step (f) is practiced by determining a slope m of the line connecting the known points, and determining the normal distance between the line connecting the known points and the energy content.

5. A method according to claim 4, wherein step (f) is further practiced by determining a y-axis intercept b of the line connecting the known points.

6. A method according to claim 5, wherein a point on the line connecting the known points at a time $t_i$ is determined in accordance with the relation $y_i = mt_i + b$.

* * * * *